United States Patent [19]
Kass et al.

[11] Patent Number: 5,984,341
[45] Date of Patent: *Nov. 16, 1999

[54] WEIGHT DISTRIBUTING HITCH AND SLIDE BRACKET ASSEMBLY

[75] Inventors: John J. Kass; Richard W. McCoy, both of Granger, Ind.

[73] Assignee: University of Kentucky Research Foundation, Lexington, Ky.

[*] Notice: This patent is subject to a terminal disclaimer.

[21] Appl. No.: 09/000,176

[22] PCT Filed: May 28, 1997

[86] PCT No.: PCT/US97/09368

§ 371 Date: Jan. 22, 1998

§ 102(e) Date: Jan. 22, 1998

[87] PCT Pub. No.: WO97/45279

PCT Pub. Date: Dec. 4, 1997

Related U.S. Application Data

[60] Provisional application No. 60/018,670, May 30, 1996.

[51] Int. Cl.⁶ ........................................ B60D 1/42
[52] U.S. Cl. ................... 280/455.1; 280/406.1; 280/484
[58] Field of Search ............... 280/455.1, 406.1, 280/484, 406.2, 405.1, 483

[56] References Cited

U.S. PATENT DOCUMENTS

| | | | |
|---|---|---|---|
| 3,294,421 | 12/1966 | Mathison | 280/455.1 |
| 3,542,394 | 11/1970 | Palage | 280/455.1 |
| 3,542,395 | 11/1970 | Millikaa | 280/406.1 |
| 3,600,004 | 8/1971 | Newkirk | 280/406.1 |
| 3,989,269 | 11/1976 | Rendessy | 280/455.1 |
| 4,165,885 | 8/1979 | Good et al. | 280/455.1 |
| 5,628,525 | 5/1997 | Kass et al. | 280/406.1 |
| 5,647,603 | 7/1997 | Kass et al. | 280/406.1 |
| 5,799,965 | 9/1998 | Kass et al. | 280/406.1 |

FOREIGN PATENT DOCUMENTS

| | | | |
|---|---|---|---|
| 2038259 | 7/1980 | United Kingdom | 280/455.1 |
| 4008804 | 4/1994 | WIPO | 280/455.1 |

*Primary Examiner*—Christopher P. Ellis
*Attorney, Agent, or Firm*—King and Schickli

[57] ABSTRACT

A weight distributing and sway controlling hitch assembly for towing a trailer behind a vehicle includes a hitch bar for mounting to a vehicle. The hitch assembly also includes a ball mount head carried on the hitch bar and a hitch connector carried on the ball mount head. A pair of friction pads are also provided for mounting on the trailer. Additionally, the hitch assembly includes a pair of shoes, each of the shoes being received on one of the pair of friction pads while allowing relative sliding movement thereto. Still further, the hitch assembly includes a pair of spring bars for distributing trailer weight relative to the vehicle. Each of the spring bars includes a proximal end mounted to the ball mount head and a distal end for engaging one of the shoes.

5 Claims, 2 Drawing Sheets

5,984,341

WEIGHT DISTRIBUTING HITCH AND SLIDE BRACKET ASSEMBLY

This application claims the benefit of U.S. Provisional Application Ser. No. 60/018,670, filed May 30, 1996.

TECHNICAL FIELD

The present invention relates generally to the towing field and, more particularly, to a new and improved weight distributing hitch assembly incorporating a novel spring bar and slide block or shoe arrangement for distributing weight and controlling trailer sway.

BACKGROUND OF THE INVENTION

Hitch assemblies for more evenly distributing the tongue weight of a trailer over the front and rear axles of a towing vehicle are well known in the art. A particularly advanced design of weight distributing hitch assembly is disclosed in the assignee's issued U.S. Pat. No. 5,375,872 to Kass et al. entitled "Weight Distributing Hitch". This hitch assembly includes a hitch bar for receipt in a receiver mounted to the vehicle and a ball mount head for mounting on the hitch bar at a selected tilt angle. A pair of spring bars are mounted at their proximal end to the ball mount head. The distal ends of these spring bars are connected by means of cooperating lift units and chains to the frame of the trailer. Such state of the art lift units are exemplified by Reese Products, Inc. product number 21160 incorporating a body that is mounted to the trailer frame, a chain hook with pivoting locking lever and a safety pin for securing the chain hook and lever in an operative position. As is known in the art, the amount of leveling or load transfer to the front axle of the vehicle is adjusted by the selection of the tilt angle of the ball mount head and the engagement of different links of the chains with the chain hooks of the lift units.

While such an arrangement is effective for its intended purpose, it should also be appreciated that the state of the art lift unit connection between the spring bars and trailer frame provides little or no effective means of resisting or controlling trailer sway: that is, undesirable lateral movement of the trailer relative to the towing vehicle. In fact, such sway may arise as a result of a number of factors often encountered during towing operation including uneven, rough and/or winding road conditions; gusty cross-wind weather conditions, uneven trailer loading conditions; and/or result from inherently incompatible trailer and towing vehicle suspension characteristics. Accordingly, a need is also identified for a weight distributing hitch assembly that provides some inherent control of trailer sway to maximize driver confidence, comfort and control during towing.

SUMMARY OF THE INVENTION

Accordingly, it is a primary object of the present invention to provide a weight distributing hitch assembly of an improved design overcoming the above-described limitations and disadvantages of the prior art.

Another object of the present invention is to provide an improved weight distributing hitch assembly incorporating a spring bar and slide block or shoe arrangement which effectively provides both weight distribution and sway control so as to improve towing performance and overall driver comfort.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved weight distributing hitch assembly is provided for towing a trailer behind a vehicle. The weight distributing hitch assembly includes a hitch bar of a type known in the art for mounting to the towing vehicle. More specifically, the hitch bar includes a mounting post that is received in the receiver box of a hitch receiver that is secured to the frame of the towing vehicle in a known manner.

The weight distributing hitch assembly also includes a ball mount head for mounting on the distal or head-receiving end of a hitch bar. Preferably, a hitch ball, also of a type well known in the art, is carried on the ball mount head. Such a hitch ball is adapted for receipt in a cooperating trailer coupler socket of the trailer to be towed behind the vehicle.

The weight distributing hitch assembly also includes a pair of friction pads. These friction pads are mounted to opposing sides of the trailer such as the outwardly directed faces of the two frame rails that form an A-frame trailer.

The weight distributing hitch assembly also includes a pair of spring bars for distributing trailer weight relative to the vehicle. More specifically, each of the spring bars include a mounting trunnion at its proximal end that allows the spring bar to be secured to the ball mount head. Each spring bar also includes an inwardly projecting or transverse lug adjacent a distal end.

Still further, the hitch assembly also includes a pair of slide blocks or shoes. One shoe is received on and mounted to the lug at the distal end of each spring bar. In operation, the shoes engage and slide along the friction pads carried on the trailer frame. Since each friction pad is formed from a durable, high friction material, frictional resistance to relative sliding movement of the shoes is provided. As a result, lateral movement of the trailer relative to the towing vehicle is resisted and, therefore, an effective anti-sway mechanism is advantageously provided. It should be appreciated, however, that this frictional resistance is readily overcome during operator controlled vehicle maneuvering so that relative pivotal movement about the hitch ball and coupler socket is freely allowed during turning. Thus, trailer sway is resisted without compromising any operator control.

Preferably each shoe includes a retaining bracket and cooperating fasteners that are utilized to secure the shoe to the lug of the associated spring bar. In addition, each shoe includes a channel defining a load bearing face that engages one of the friction pads. The channel further includes side walls that lap the engaged friction pad and maintain proper alignment between the engaged friction pad and the shoe during towing.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

3

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
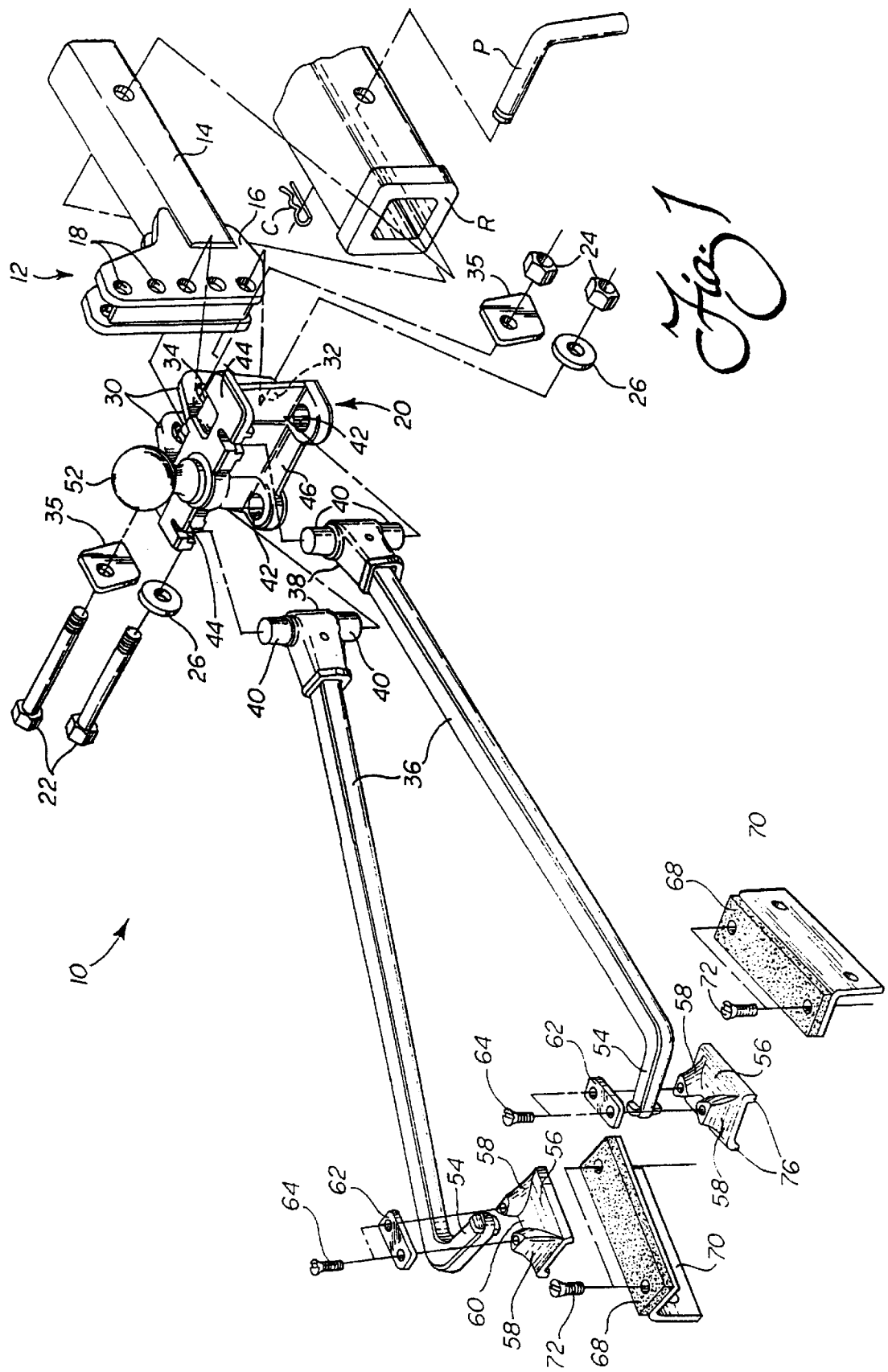
FIG. 1 is an exploded perspective view of the weight distributing hitch assembly of the present invention.

Reference is now made to FIG. 1 showing the weight distributing hitch assembly 10 of the present invention. As should be appreciated, the hitch assembly 10 includes a hitch bar 12 of a type known in the art including a tubular mounting post 14 for engagement in a receiver box R of a hitch receiver mounted to a vehicle (not shown). A pin P and cooperating clip C secure the hitch bar 12 in the receiver box R. Such a hitch receiver is, for example, a Class III 35 Series hitch receiver as manufactured by Reese Products, Inc. of Elkhart, Indiana, the assignee of the present invention.

The distal end of the hitch bar 12 includes a split end mounting rack 16 having a series of aperture sets 18 allowing for height adjustment of the ball mount head 20. The ball mount head 20 may be a one-piece, integral construction cast from ductile iron. The ball mount head 20 is secured to the mounting rack 16 of the hitch bar 12 by means of two cooperating fasteners shown as bolts 22 and cooperating locking nuts 24. Washers 26 may be provided on the lower bolt 22 if desired.

More specifically the ball mount head 20 includes a pair of spaced, parallel mounting flanges 30 so as to form a yoke adapted to be received on the mounting rack 16. When properly mounted, the lower bolt 22 extends through the aligned cooperating apertures 32 (only one visible in FIG. 1) in the mounting flanges 30, the two washers 26 and the one aligned aperture set 18 in the interdisposed mounting rack 16. Similarly, upper bolt 22 extends through a pair of indexable, eccentric washer 35, the aligned cooperating arcuate slots 34 in the mounting flanges 30 and through a second aligned aperture set 18 in the interdisposed mounting rack 16. The arcuate slots 34 allow the ball mount head 20 to be pivoted relative to the hitch bar 12 about the lower bolt 22. The locking nuts 24 are then placed upon the bolt 22 and tightened. This arrangement allows the tilt angle of the ball mount head 20 to be selected by manipulation of the indexable, eccentric washers 35 in a manner described in detail in previously referenced U.S. Pat. No. 5,375,872 to Kass et al.

As also shown in FIG. 1, the weight distributing hitch assembly 10 includes a pair of spring bars 36. Each spring bar 36 includes a trunnion 38 at its proximal end for mounting in the ball mount head 20. More specifically, each mounting trunnion 38 includes a pair of oppositely disposed and outwardly projecting pivot pins 40. As is known in the art, the pivot pins 40 are received in a first set of cooperating sockets 42 in the upper and lower legs or platforms 44, 46 of the ball mount head 20. A more detailed presentation of the trunnion connection of the spring bars 36 to the ball mount head 20 is presented in the assignee's U.S. Pat. No. 5,562,298, filed on Oct. 7, 1994, entitled "Weight Distributing Hitch Assembly", the disclosure of which is fully incorporated herein by reference. Each spring bar 36 also includes a lug 54 adjacent the distal end thereof that projects inwardly in a transverse direction. Thus, the lug 54 and main body of the spring bar 36 form a substantially L-shape.

The upper platform 44 of the ball mount head 20 also includes an aperture for receiving a hitch connector such as hitch ball 52. The hitch ball 52 is secured to the upper platform 44 by a weld or other appropriate means known in the art.

A slide block or shoe 56 is secured to each lug 54. More specifically, each shoe 56 includes a pair of mounting posts 58 defining a lug receiving slot 60 therebetween. As shown best in FIG. 2, the lug 54 is positioned in the slot 60 and is held in position by an overlying clamp 62 secured in place by a pair of fasteners such as screws 64 that threadedly engage in the mounting posts 58. Further, each lug 54 includes a slightly flared or dimpled end 66 that prevents the lug from pulling free from the shoe 56 when clamped in position. More specifically, when the lug 54 is properly clamped in the shoe 56, the flared or dimpled end 66 prevents the lug 54 from pulling out of the shoe 56 back through the slot 60.

Figure 2:
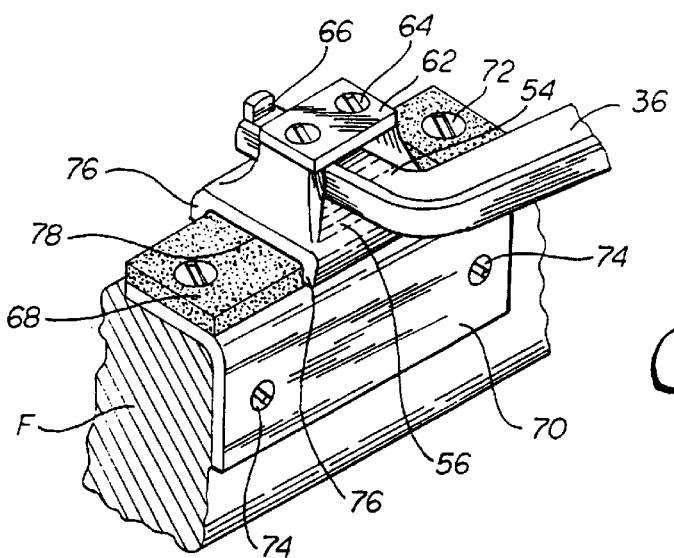
FIG. 2 is a detailed fragmentary and partially sectional view showing the positioning of a spring bar with associated shoe for sliding along a friction pad carried on the trailer frame.

As best shown in FIG. 2, the shoe 56 on each spring bar 36 is received by and rides upon a friction pad 68. The friction pad 68 is formed from a durable, high friction material such as available from Friction Material Company under products designation NA 104 which is bonded to a supporting substantially L-shaped mounting bracket 70 preferably formed from a sheet metal such as steel. Two countersunk screws 72 engage the bracket 70 and thereby secure the friction pad 68 and bracket to the frame. Fastener such as screws 74 or cooperating nuts and bolts (not shown) are utilized to secure the mounting brackets 70 to the frame F of the trailer when holes are not permitted in the top flange of the frame.

Figure 3:
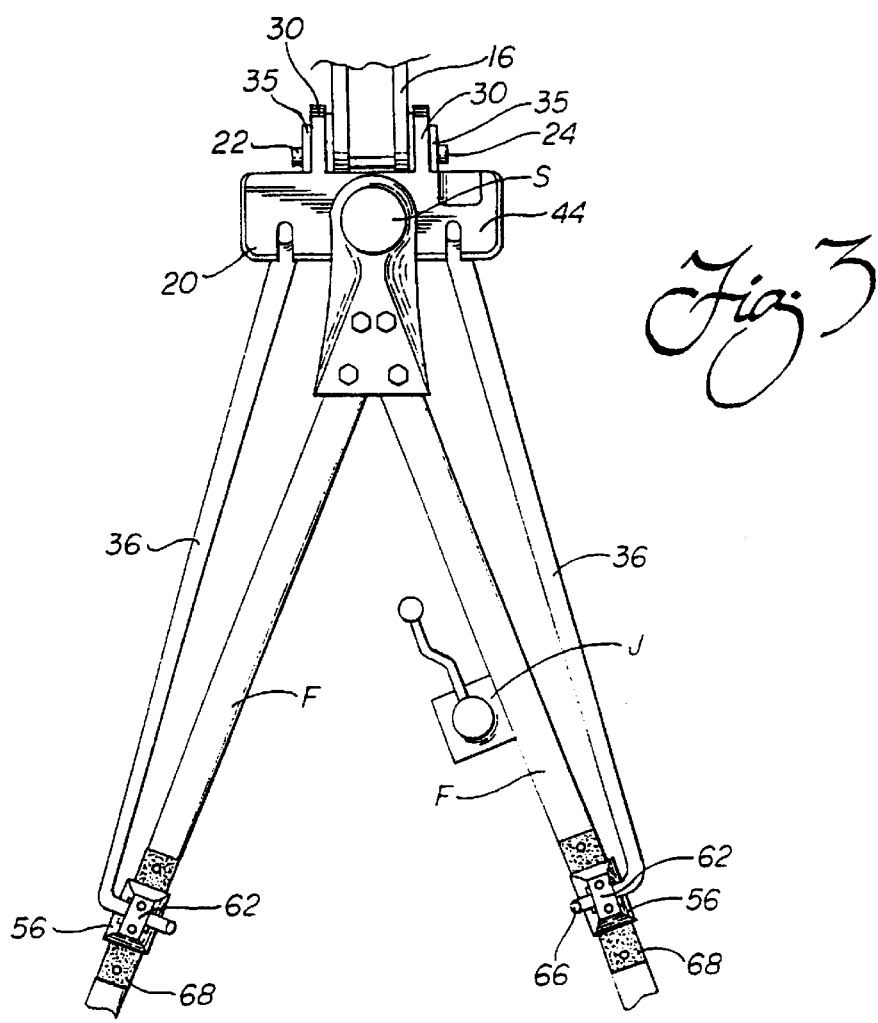
FIG. 3 is a top plan view showing connection to a trailer.

More specifically, as shown in FIG. 3, one friction pad 68 is mounted to each frame rail F behind the trailer coupler socket S. In this position, each friction pad 68 is oriented to receive a shoe 56 or one of the spring bars 36. Spaced, parallel guide rails 76 (see FIG. 2) at the inner and outer margins of each shoe 56 form the sidewalls of a channel 78 that insures that the shoes slide smoothly along and over the friction pads 68 without binding. Each friction pad 68 resists free sliding movement of the shoe 56 riding thereon. Such sliding movement is, of course, generated whenever the trailer begins to sway in response to, for example, rough, uneven and/or winding road conditions, gusts and crosswinds and uneven trailer loading. At these and certain other times the frictional forces generated between the pads 68 and shoes 56 oppose or resist the lateral movement of the towed trailer relative to the towing vehicle. Trailer sway is consequently reduced or virtually eliminated under substantially any anticipatable operating conditions.

It should be appreciated, however, that the degree of resistance to transverse movement is not great enough to interfere with the relative pivotal motion of the trailer about the hitch ball 52 and coupler sockets that occurs as a result of driver input during normal vehicle operation. Thus, the trailer still properly tracks behind the vehicle during towing. Thus, it should be appreciated that sway control is advantageously provided without any compromise of other important operating characteristics.

In use, the forward end of the trailer including the coupler sockets is initially raised using the tongue jack J. The vehicle and trailer is then positioned so that the hitch ball 52 underlies the coupler socket S. Using the tongue jack J, next the front end of the trailer is lowered so that the coupler socket S nests over the hitch ball 52. The coupler latch is then closed to secure the trailer to the towing vehicle through the hitch assembly 10.

Next the front of the trailer and the rear of the tow vehicle are raised about 2–3 inches by operation of the tongue jack J. From this position, an individual may grasp an intermediate portion of the spring bar 36 adjacent to the distal end thereof and flex the spring bar upwardly. By shifting the spring bar 36 laterally once it clears the trailer frame rails F, the spring bar may be released and the shoe 56 or channel 78 dropped onto a friction pad 68. This is done so that the guide rails 76 overlap the side edges of the friction pad 68 and the weight bearing surface of the shoe 56 defined between the guide rails engages the friction pad. As noted above, the guide rails 76 insure that the shoe 56 remains in proper alignment as it slides relative to the pad 68.

The individual operator then positions the second spring bar 36 in the same manner. The trailer tongue jack J is then retracted so that the hitch assembly 10 is distributing the full trailer tongue weight over the front and rear axles of the towing vehicle in the desired manner. This is a simple and efficient operation that may be completed at the utmost convenience, confidence and satisfaction of the individual. There is no need to select a proper chain link or secure a lift bracket with a safety clip as required by the state of the art lift units commonly utilized in this field.

Additionally, the present weight distributing hitch assembly 10 goes a step further than prior art weight distributing hitch assemblies by providing control of trailer sway. Specifically, the friction pads 68 provide sufficient resistance to the relative sliding movement of the shoes 56 to dampen swaying motion without actually interfering with proper pivotal movements of the trailer initiated by vehicle operator inputs when turning during the towing operation. Accordingly, it should be appreciated that the present invention represents a significant advance in design that achieves more than the prior art weight distributing hitch designs.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A weight distributing and sway controlling hitch assembly for towing a trailer behind a vehicle, comprising:
    a hitch bar for mounting to the vehicle;
    a ball mount head carried on the hitch bar;
    a hitch connector carried on the ball mount head;
    a pair of friction pads mounted on the trailer;
    a pair of shoes, each shoe of said pair of shoes being received on one of said friction pads while allowing relative sliding movement thereto; and
    a pair of spring bars for distributing trailer weight relative to said vehicle, each of said spring bars including a proximal end mounted to said ball mount head and a distal end for engaging one of said pair of shoes.

2. The hitch assembly set forth in claim 1, wherein each of said pair of shoes includes a channel defining a load bearing surface for engaging one of said pair of friction pads, said channel further including sidewalls that lap said engaged friction pad to maintain proper alignment between said engaged friction pad and said engaging shoe.

3. The hitch assembly set forth in claim 1, wherein each of said pair of shoes includes a pair of mounting posts defining a lug receiving slot, a clamp and a fastener for securing said clamp to said mounting posts.

4. The hitch assembly set forth in claim 3, wherein said distal end of each of said pair of spring bars includes a projecting lug.

5. The hitch assembly set forth in claim 4, wherein said projecting lug includes a flared end.

\* \* \* \* \*

UNITED STATES PATENT AND TRADEMARK OFFICE
CERTIFICATE OF CORRECTION

PATENT NO. : 5,984,341
DATED : November 16, 1999
INVENTOR(S) : John J. Kass and Richard W. McCoy It is certified that error appears in the above-identified patent and that said Letters Patent is hereby corrected as shown below:

On title page, item 73 Assignee
replace "University of Kentucky Research Foundation, Lexington, Ky."
with --Reese Products, Inc., Elkhart, Indiana--.

Signed and Sealed this

Fifteenth Day of August, 2000

Attest:

Q. TODD DICKINSON

Attesting Officer     *Director of Patents and Trademarks*